A. J. MONFEE.
BLOW-OFF VALVE.
APPLICATION FILED MAY 24, 1916.
1,222,972.
Patented Apr. 17, 1917.
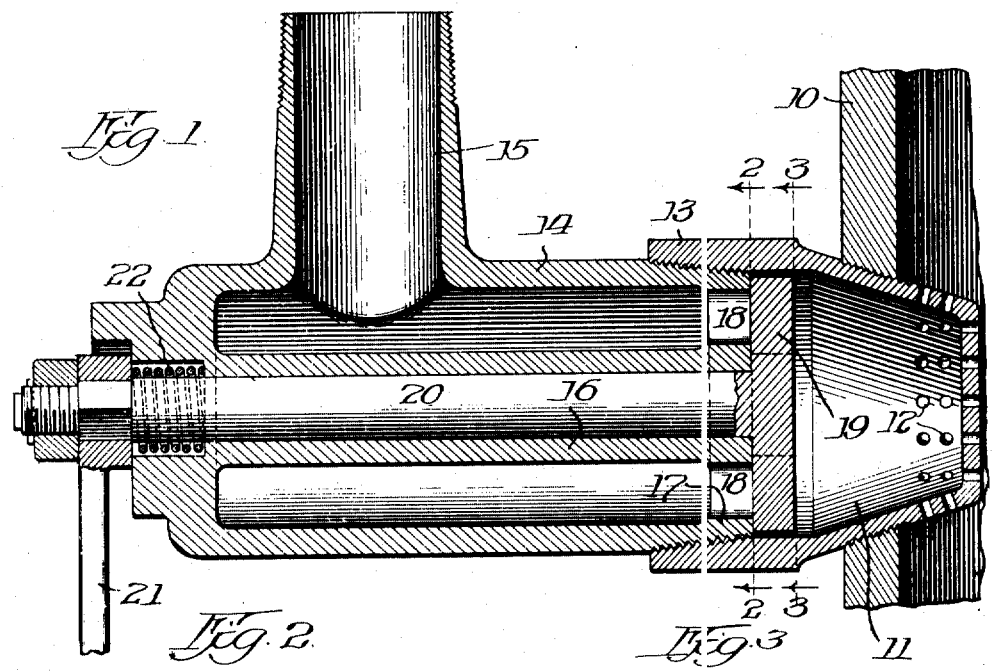
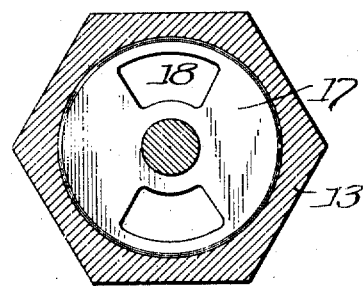
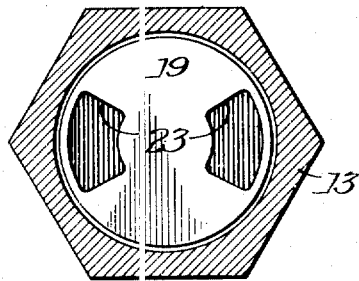
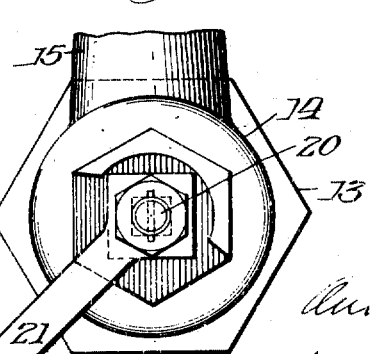
Witnesses:
Inventor
Andrew J. Monfee
By Chauncey Atty.

UNITED STATES PATENT OFFICE.

ANDREW JACKSON MONFEE, OF PRATT CITY, ALABAMA.

BLOW-OFF VALVE.

1,222,972.  Specification of Letters Patent.  Patented Apr. 17, 1917.

Application filed May 24, 1916. Serial No. 99,553.

*To all whom it may concern:*

Be it known that I, ANDREW JACKSON MONFEE, a citizen of the United States, and resident of Pratt City, in the county of Jefferson and State of Alabama, have invented certain new and useful Improvements in Blow-Off Valves, of which the following is a specification.

My invention relates to valves and has particular reference to a novel blow-off valve.

An object in the design of the valve here disclosed is to provide one in which no packing nor gaskets are necessary; in which the valve is straightway, quick acting and easy opening, and in which the body is composed of but a single piece. By reason of this construction no bolts and nuts are necessary and there are but five principal parts to the valve. By reason of the arrangement shown it is not possible for pieces of solid matter to lodge on the face of the valve and interfere with the operation thereof. This result is secured by providing an integral member adapted to be seated within the boiler shell, which member acts as a strainer, and within the open outer end of which the casing is mounted. The casing, valve seat and valve member may be removed from the nipple as a whole. The reason that no packing is required for the valve-operating stem is in that the stem is located within a long sleeve which is on the opposite side to that on which pressure is exerted.

The invention will be more readily understood by reference to the accompanying drawings, wherein—

Figure 1 is a longitudinal sectional view through a blow-off valve constructed in accordance with my invention;

Figs. 2 and 3 are sections on the lines 2—2 and 3—3 respectively of Fig. 1, and

Fig. 4 is an end elevation of the construction shown in Fig. 1.

In the drawings it will be seen that an opening is provided in the boiler shell 10, within which opening is mounted a nipple 11, the inner end of which is provided with a plurality of small apertures 12 and being otherwise imperforate. The female end of the nipple 13 is threaded interiorly and accommodates the threaded end of the casing 14. The casing 14 has an angular outlet 15 and is axially intersected by an integral tubular portion 16. The inner end of this tube terminates in the spider 17, the shape of which is best shown in Fig. 2. Openings 18 through the spider provide for the passage of fluid through the casing. The face of the spider acts as a seat for the disk valve 19 integral with or attached to the stem 20, which lies within the tubular portion 16. The stem terminates outside of the casing, an operating arm 21 being secured to the squared portion thereof. A coil spring 22 is seated in a countersunk portion of the casing and tends to force the valve on its seat. The disk valve 19 is provided with openings 23 therein which in one position of the valve register with the openings 18 in the seat.

The extreme simplicity of the valve will commend itself to those skilled in the art. The nipple portion, which acts as a strainer, need not be removed from its engagement with the boiler seat, all of the operating parts of the valve being removed with the casing. Obviously modifications may be made in the construction shown and such modifications as are within the scope of my claim I consider within the spirit of my invention.

I claim:

A blow-off valve comprising in combination, a nipple having an outside thread for direct attachment to a boiler shell with a portion projecting within the boiler shell and provided with a relatively large number of small apertures, said nipple having also an interior thread on its outer end, a casing screwed into the outer end of said nipple, said casing comprising an outer shell 14 with an outlet 15 and having an integral, longitudinally extending, tubular portion 16, connected at one end by a perforated valve seat with the outer shell 14 and connected at the opposite end by an imperforate portion with the outer shell 14, said tubular portion 16 being open from end to end and carrying a stem 20, on which is a valve 19 having a flat, smooth, exposed face and said nipple having its inner face also flat and smooth so as to prevent the lodgment of solid matter on or around the valve to interfere with its operation, and the valve and stem being integral so as to reduce the number of parts to a minimum.

Signed at Pratt City, Alabama, this 10 day of May, 1916.

ANDREW JACKSON MONFEE.

Witnesses:
F. C. BAKER,
CHARLES F. SMITH.